United States Patent [19]

Holt

[11] Patent Number: 4,773,864

[45] Date of Patent: Sep. 27, 1988

[54] APPARATUS FOR ENHANCING SURGICAL SKILLS

[76] Inventor: Byron B. Holt, 612 Hedwig, Houston, Tex. 77024

[21] Appl. No.: 90,857

[22] Filed: Aug. 31, 1987

[51] Int. Cl.$^4$ .............................................. G09B 23/28
[52] U.S. Cl. .................................... 434/262; 434/273; 269/54.3
[58] Field of Search ...................... 434/273, 262, 267; 248/176, 178; 269/54.3, 328

[56] References Cited

U.S. PATENT DOCUMENTS

| | | | |
|---|---|---|---|
| 781,977 | 2/1905 | Wentworth | 248/176 |
| 1,201,061 | 10/1916 | Lang | 248/176 |
| 2,966,383 | 12/1960 | Boetcker et al. | 269/328 |
| 4,001,952 | 1/1977 | Kleppinger | 434/262 |
| 4,108,426 | 8/1978 | Lindstrom et al. | 269/328 |

FOREIGN PATENT DOCUMENTS 513534  2/1955  Italy ..................... 248/178

Primary Examiner—James C. Yeung
Attorney, Agent, or Firm—Bill B. Berryhill

[57] ABSTRACT

Apparatus for enhancing the skills of a surgeon in performing laser surgery by supporting a specimen of a body organ for practice thereon. The apparatus may include a base member and first and second support members extending upwardly therefrom. First and second ring members are supported by the first and second support members at predetermined axial spacing. Radially adjustable holding elements are carried by each of the ring members for centrally holding the specimen therein.

9 Claims, 1 Drawing Sheet

APPARATUS FOR ENHANCING SURGICAL SKILLS

BACKGROUND OF THE INVENTION

1. Field of the Invention

The present invention pertains to apparatus for enhancing surgical skills. More specifically, the present invention pertains to apparatus for supporting a specimen of a body organ for practicing surgery thereon. In particular, the present invention provides apparatus for enhancing the skills of a surgeon in performing laser surgery of the female reproductive organs by supporting a post-hysterectomy specimen for surgical practice thereon.

2. Description of the Prior Art

Menorrhagia, the medical term for abnormal bleeding of the uterus, may occu anytime between menarche and menopause. When the cause of bleeding is structural, such as polyps or fibroid tumors, a hospital dilatation and curettment (D & C) under general anesthesia is usually recommended. Most often D & C provides only a temporary solution to the problem. Studies indicate that relief from menorrhagia is achieved in only zero to fifty percent of the patients. When menorrhagia is the result of hormonal imbalance, oral contraceptives or other drugs may be prescribed. If these excepted treatments do not provide positive results, it may be necessary to perform a hysterectomy. Each year approximately 750,000 hysterectomies are performed in the United States alone, one-third of which are performed for excessive uterine bleeding. A hysterectomy is a major surgical procedure with significant risks. An average of four to seven days of hospitalization is required for recovery. Thus, significant expense is incurred by hospitalization and loss of productivity.

In recent years, laser surgery or ablation has been developed for treatment of menorrhagia as an alternative for hysterectomy. The term "laser" stands for light amplification by stimulated emission of radiation. Light waves are intensified and focused into a narrow, concentrated beam of light that is converted to heat at the target tissue. A type of laser, the $CO_2$ laser, has been used in gynecologic surgery for more than a decade in the treatment of such common conditions as venereal warts and pre-cancerous lesions of the cervix. The $CO_2$ laser cuts deeply with an intense infrared light produced by the electrical stimulation of a mixture of carbon dioxide, nitrogen and helium gases. The $CO_2$ laser literally vaporizes tissue when its heat is absorbed by the moisture in the cells, and converts the moisture to steam. In more recent developments, the YAG laser has been developed for commercial use in hospitals. The YAG laser uses a solid yttrium aluminum garnet crystal and the rare element neodyminum to produce an intense infrared light.

In the accepted protocol for YAG laser ablation, a D & C or endometrial biopsy is first obtained in the hospital or the office to rule out any endometrial patholoty such as cancer. For approximately three weeks or longer the male hormone Danazol (trade name: Danocrine) is prescribed to temporarily inhibit the ovaries from hormone production. This produces a thin atrophic endometrium which will be only a few millimeters thick.

After proper preparation, laser surgery is then performed in a hospital or freestanding clinic where a YAG laser and equipment are available. Under general or epidural anesthesia, a hysterescope (a telescope-like instrument) is passed through the cervical canal and into the uterine cavity. By direct visualization, the thin atrophic endometrium can be seen. A fiberoptic cord is passed through the hysterescope. The YAG laser beam is then emitted via the tip of the fiber optic cord. Under direct visualization the endometrium is ablated and destroyed. The surrounding myometrium (uterine muscle) will shrink and become smaller.

Where appropriate, laser ablation offers a number of advantages:

(1) The procedure is usually performed on an outpatient basis and required only thirty to forty-five minutes for an experienced surgeon.

(2) There is little or no pain or discomfort.

(3) The patient is able to return to work within one to two days of surgery.

(4) All of the female organs remain intact (cervix, uterus and ovaries).

(5) The cost is significantly less when compared to that of a hysterectomy.

(6) Loss of income and time from employment is substantially reduced.

(7) Insurance companies may pay most or all of the medical expenses if the procedure is performed on an outpatient basis.

FDA approval of YAG laser ablation as an alternative to hysterectomy and D & C for treatment of menorrhagia was granted in 1986. Such approval will allow trained gynecologists to use the YAG laser as an alternative treatment of pelvic endometrosis and bicornuate uterus. It may also be an effective surgical treatment with minumal discomfort and trauma for the mentally retarded who have difficulty in caring for menstrual needs. Laser ablation of the endometrium is also a sterilizing procedure and many females may select this procedure as a method of accomplishing sterilization and decreasing menstrual flow. Laser ablation may also be useful for treatment of postmenopausal women being treated with hormone treatment replacement therapy who continue to have vaginal bleeding.

YAG laser surgery is very precise and one of the problems, of course, for surgeons learning this new procedure and enhancing their skills is obtaining the necessary practice. Of course, an inexperienced surgeon should not be allowed to practice this procedure on a patient. Thus, the procedure is normally practiced on a post-hysterectomy specimen. Supporting and positioning the post-hysterectomy specimen for practice of YAG laser surgery thereon has presented somewhat of a problem.

SUMMARY OF THE INVENTION

The present invention provides apparatus for enhancing the skills of a surgeon in performing YAG laser surgery of the uterus by properly positioning and supporting a post-hysterectomy specimen for practice thereon. With the apparatus of the present invention, the problems of properly supporting the specimen are overcome.

The apparatus of the present invention comprises a base member and first and second support members extending upwardly therefrom. First and second ring members are attached to the first and second support members, respectively, at the peripheries thereof, so that that the ring members are supported at predetermined axial spacing. Radially adjustable holding elements are carried by each of the ring members for centrally holding the post-hysterectomy specimen therein. One of the ring members may be of a smaller diameter than the other for supporting a smaller portion of the specimen, the larger portion thereof being supported within the larger diameter ring member.

Thus, the apparatus of the present invention provides a very effective aid to support a post-hysterectomy specimen for enhancing the skills of a surgeon by practicing laser surgery of the uterus. The apparatus is effective, easy to use, easily adjusted for differing sizes of specimens and relatively inexpensive. Other objects and advantages of the invention will be apparent from reading the description which follows in conjunction with the accompanying drawings.

DESCRIPTION OF PREFERRED EMBODIMENT

Figure 1:
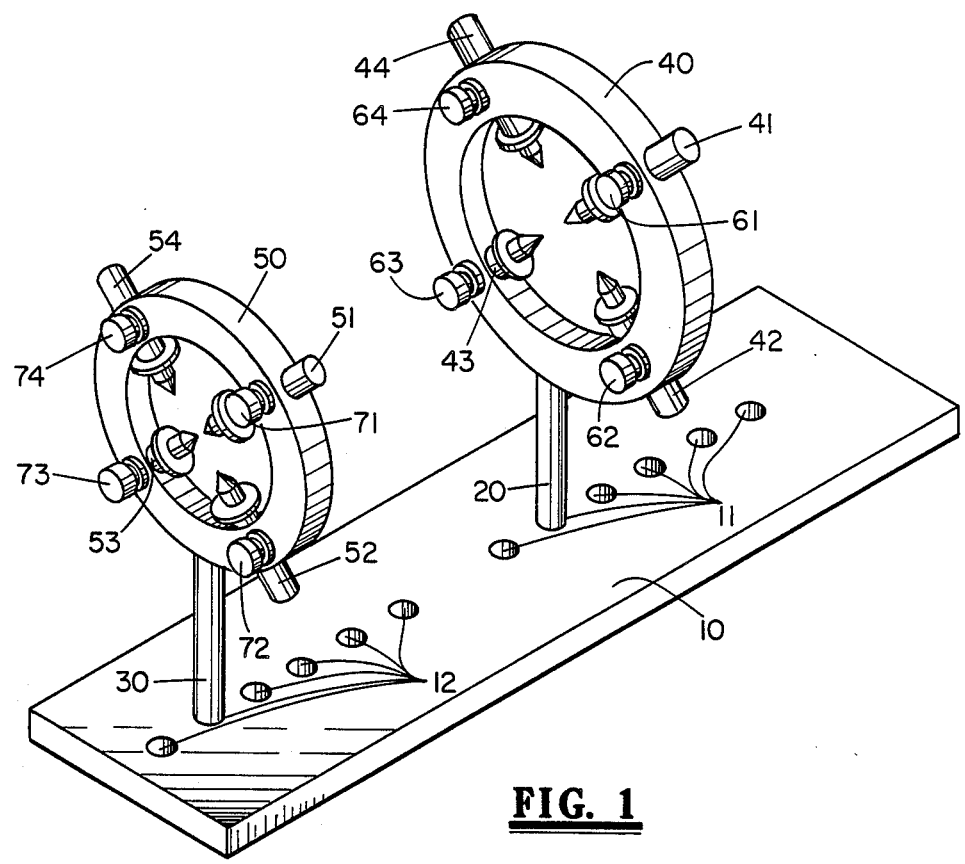
FIG. 1 is a perspective view of apparatus of supporting a specimen of a body organ, according to a preferred embodiment of the invention.

Referring first to FIG. 1, there is shown an assembled view of apparatus of the present invention suitable for supporting a specimen of a body organ for surgical practice thereon. The apparatus comprises a base member 10, first and second support members 20 and 30 and first and second ring members 40 and 50.

The base member 10 is preferrably a rectangular metalic plate through which a plurality of vertical smooth bore holes 11, 12 are provided. The holes 11 are associated with the first support member 20 and ring member 40. The holes 12 are associated with second support member 30 and ring 50. The center of these holes 11, 12 lie on a common imaginary line.

Figure 2:
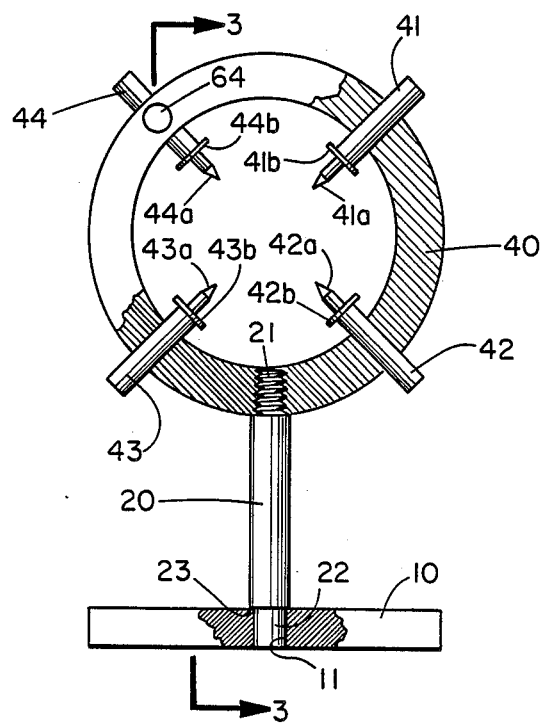
FIG. 2 is an end elevation, partially in section, of a portion of the apparatus of FIG. 1.

The support members 20, 30 extend upwardly from the base member 10. As best seen in FIG. 2, the upper end of the support member 20 is threaded at 21 for attachment of the ring member 40. The lower end 22 of the support member 20 is of a reduced diameter, providing an annular shoulder 23 for resting on the upper surface of the base member 10. The diameter of the small diameter portion 22 is slightly less than the internal diameter of the base member holes 11 permitting a axially sliding engagement fit therebetween. Thus, the support member 20 can be easily repositioned in any one of the holes 11.

As shown, each of the ring members 40, 50 is attached to its respective support member 20, 30 by threaded engagement at its periphery with the threaded portion of the support, such as 21 of the support member 20. Each of the ring members 40, 50 is preferrably provided with radial holes at ninety degree intervals in which are carried a plurality of pin members 41, 42, 43, 44, 51, 52, 53, 54. Each of the pin members has a smooth cylindrical body for sliding movement and radial positioning within the respective radial holes of the ring members 40 and 50. The inward ends of each of the pins 41-44 and 51-54 are pointed (see 41a, 42a, 43a, 44a in FIG. 2) to provide better engagement with specimens supported therein. As also seen in FIG. 2, annular rings 41b, 42b, 43b and 44b may also be provided on the pins to limit outward radial movement thereof.

Figure 3:
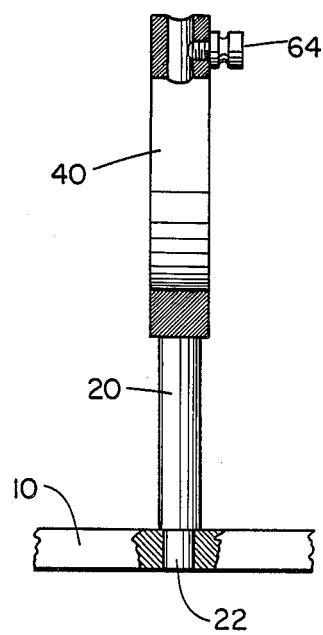
FIG. 3 is a sectional elevation, taken along the lines 3—3 of FIG. 2, of a portion of the apparatus of the present invention, according to a preferred embodiment thereof.

Associated with each pin 41-44 and 51-54 of the ring members 40 and 50 are set screws 61, 62, 63, 64, 71, 72, 73, 74 which threadedly engage threaded holes provided in ring members 40 and 50, such threaded holes having axes which are perpendicular to the axes of the radial holes in which the pin members 41-44 and 51-54 are carried. This may best be seen in FIG. 3, in which pin 44 has been removed for a better understanding thereof. It is quite evident that the purpose of the set screws 61-64 and 71-74 is to hold their respective pins 41-44 and 51-54 in a fixed radial position. Of course, loosening of the set screw allows radial positioning of the corresponding pin. The pins 41-44 and 51-54 and the set screws 61-64 and 71-74 are the components of radially adjustable holding means for simply holding a specimen within the ring members 40 and 50.

In use, the support members 20 and 30 are placed in a selected hole 11 and 12, respectively, suitable for the size of the particular post-hysterectomy specimen to be supported thereby. The pin members 41-44 and 51-54 are radially retracted so as to allow placement of the specimen within the ring members 40 and 50. It will be noted that one of the ring members 50 is smaller than the other 40. The larger portion or body portion of the uterine specimen is placed within the ring member 40 and the smaller or neck portion of the specimen is placed within the smaller ring 50. Then the pins 41-44 and 51-54 are projected inwardly for proper engagement with the specimen when the specimen is centrally located within the respective ring members 40 and 50. The set screws 61-64 and 71-74 are then engaged with respective pin members so as to hold them in fixed radial positions. Thus, the specimen is properly and centrally supported within the ring members 40, 50. With the specimen securely supported, laser surgery may be practiced thereon to enhance the skills of the surgeon in performing laser surgery.

The apparatus of the present invention was especially developed for practicing YAG laser ablation, an approved surgical technique, as an alternative to hysterectomy. Of course, the apparatus of the invention could be used for supporting other body organs for other surgical and medical purposes. Furthermore, while a single embodiment of the invention has been described herein, many variations thereof can be made without departing from the spirit of the invention. Accordingly, it is intended that the scope of the invention be limited only by the claims which follow.

I claim:

1. Apparatus for enhancing the skills of a surgeon in performing laser surgery on a body organ by supporting a laboratory specimen of said body organ for practice thereon, said apparatus comprising:
   a base member;
   first and second support members extending upwardly from said base member;
   first and second ring members attached to said first and second support members so that said ring members are supported at predetermined axial spacing; and
   adjustable holding means carried by each of said ring members for holding said specimen within said ring members by engagement therewith.

2. The apparatus of claim 1 in which said base member is provided with a plurality of holes for receiving the lower ends of said support members so that the placement of said support members in various ones of said holes effects a plurality of predetermined axially spaced relative positions by said ring members.

3. The apparatus of claim 2 in which said lower ends of said support members are slightly smaller in size than said base member holes permitting an axially slidingly engageable fit therebetween.

4. The apparatus of claim 1 in which one of said ring members is of a smaller diameter than the other.

5. The apparatus of claim 1 in which said adjustable holding means comprises a plurality of pin members disposed in radial holes provided therefor in at least one of said ring members for radial positioning within said ring member for said engagement with said specimen.

6. The apparatus of claim 5 in which each of said pin members has a smooth cylindrical body for sliding movement within said radial holes, the inward ends of said pins being pointed for better engagemen with said specimen.

7. The apparatus of claim 6 in which threaded holes, the axes of which are perpendicular to the axes of said radial holes, are provided in said ring member for receiving threaded screws for selectively engaging the body of said pin members to hold said pin members in selected radial positions within said radial holes.

8. Apparatus for enhancing the skills of a surgeon in performing laser surgery of the uterus by supporting a post-hysterectomy specimen for practice thereon, said apparatus comprising:
 a base member;
 first and second support members extending upwardly from said base member;
 first and second ring members attached to said first and second support members, respectively, at the perpripheries thereof so that said ring members are supported at predetermined axial spacing; and
 radially adjustable holding means carried by each of said ring members for centrally holding said specimen within said first and second ring members by engagement therewith.

9. The apparatus of claim 8 in which one of said ring members is of smaller diameter than the other for supporting a smaller portion of said specimen, the larger portion of said specimen being supported within the larger diameter ring member.

* * * * *